United States Patent
Bagheri et al.

(10) Patent No.: US 9,398,612 B2
(45) Date of Patent: Jul. 19, 2016

(54) SIGNALING FOR RANDOM ACCESS IN TIME DIVISION DUPLEXED (TDD) SYSTEMS WITH TRAFFIC ADAPTATION

(71) Applicant: FutureWei Technologies, Inc., Plano, TX (US)

(72) Inventors: Hossein Bagheri, Arlington Heights, IL (US); Jialing Liu, Palatine, IL (US); Weimin Xiao, Hoffman Estates, IL (US)

(73) Assignee: Futurewei Technologies, Inc., Plano, TX (US)

( * ) Notice: Subject to any disclaimer, the term of this patent is extended or adjusted under 35 U.S.C. 154(b) by 300 days.

(21) Appl. No.: 13/657,459

(22) Filed: Oct. 22, 2012

(65) Prior Publication Data

US 2014/0112259 A1    Apr. 24, 2014

(51) Int. Cl.
*H04W 72/04* (2009.01)
*H04W 74/00* (2009.01)
*H04W 72/12* (2009.01)
*H04W 74/08* (2009.01)

(52) U.S. Cl.
CPC .......... *H04W 74/006* (2013.01); *H04W 72/048* (2013.01); *H04W 72/121* (2013.01); *H04W 72/0446* (2013.01); *H04W 74/0833* (2013.01)

(58) Field of Classification Search
USPC ........................................................ 370/329
See application file for complete search history.

(56) References Cited

U.S. PATENT DOCUMENTS

| | | | |
|---|---|---|---|
| 2012/0063393 A1* | 3/2012 | Du et al. | 370/329 |
| 2012/0177006 A1* | 7/2012 | Tsai et al. | 370/331 |
| 2013/0044652 A1* | 2/2013 | Wang et al. | 370/280 |
| 2013/0188516 A1* | 7/2013 | He et al. | 370/254 |
| 2013/0265949 A1* | 10/2013 | Lee | 370/329 |
| 2014/0023004 A1* | 1/2014 | Kumar et al. | 370/329 |

OTHER PUBLICATIONS

ETSI TS 136 211 v11.0.0, Oct. 2012, 3GPP, pp. 1-108.*
"3rd Generation Partnership Project; Technical Specification Group Radio Access Network; Evolved Universal Terrestrial Radio Access (E-TURA); Physical Channels and Modulation (Release 10)," 3GPP TS 36.211 v 10.4.0 Technical Specification, Dec. 2012, 101 pages.

* cited by examiner

*Primary Examiner* — Michael Thier
*Assistant Examiner* — Yaotang Wang
(74) *Attorney, Agent, or Firm* — Slater Matsil, LLP

(57) ABSTRACT

A next-generation base station can update an uplink-downlink (UL/DL) configuration of a cell more frequently than legacy user equipments (UEs) are configured to recognize UL/DL updates while preventing non-compliant uplink transmissions in downlink subframes. For instance, a next-generation base station can restrict updates to the uplink-downlink configuration such that uplink timeslots previously allocated for random access channel (RACH) transmission opportunities by legacy UEs remain configured for uplink transmission. Alternatively, the next-generation base station can restrict the allocation of RACH transmission opportunities of legacy UEs to timeslots that are statically configured for uplink transmission. Notably, such a restriction may be selectively applied to legacy UEs, so as to not limit the performance of next-generation UEs.

21 Claims, 6 Drawing Sheets

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

SIGNALING FOR RANDOM ACCESS IN TIME DIVISION DUPLEXED (TDD) SYSTEMS WITH TRAFFIC ADAPTATION

TECHNICAL FIELD

The present invention relates generally to systems and methods for random access channel (RACH) signaling in time division duplexed (TDD) systems with traffic adaptation.

BACKGROUND

In time division duplexed (TDD) systems, some portions of a frame are reserved for carrying downlink transmissions, while other portions of a radio frame are reserved for carrying uplink transmissions. In some systems, the apportionment of uplink and downlink portions (referred to herein as the uplink-downlink (UL/DL) configuration) of a frame may be configured semi-statically or dynamically, so that UL/DL configuration may be adapted to changing network conditions.

The rate in which the UL/DL configuration is updated (or changed) may vary from network to network. For instance, third generation partnership (3GPP) long term evolution (LTE) release eleven (rel-11) networks may update the UL/DL configuration once every 640 milliseconds (ms), while 3GPP LTE release twelve (rel-12) networks may update the UL/DL configuration more often (e.g., as often as every 10 ms). As a result, base stations (eNBs) and User Equipments (UEs) adapted for 3GPP LTE rel-12 (referred to herein next-generation eNBs and UEs) may update the UL/DL configuration more often than UEs adapted for 3GPP LTE rel-11 and prior releases (referred to herein as legacy UEs) detect UL/DL configuration updates. For instance, next-generation eNBs may update the UL/DL configuration every 10 or 20 ms, while legacy UEs may only detect updates to the UL/DL configuration every 640 ms. Consequently, legacy UEs being served by next-generation eNBs may be incapable of recognizing some updates to the UL/DL configuration.

SUMMARY OF THE INVENTION

Technical advantages are generally achieved, by embodiments of this disclosure describing systems and methods for RACH signaling in TDD networks.

In accordance with embodiments of this disclosure, a method for managing random access channel (RACH) transmission opportunities is provided. In one example, the method includes transmitting a first signal to UEs indicating that legacy UEs have been assigned a first set of RACH transmission opportunities in a cell. The method further includes transmitting a second signal to next-generation UEs that indicates the next-generation UEs have been assigned a second set of RACH transmission opportunities in the cell. An apparatuses for performing the above mentioned method is also provided.

In accordance with other embodiments of this disclosure, another method for managing RACH transmission opportunities is provided. In this example, the method includes sending a first system information block (SIB) signal to legacy UEs and next-generation UEs that configures a set of uplink subframes as well as allocates a sub-set of the uplink subframes for RACH transmission by the legacy UEs. The method further includes sending a signal to the next-generation UEs that reconfigures at least some uplink subframes as downlink subframes without reconfiguring any uplink subframes in the sub-set of uplink allocated for RACH transmission by the legacy UEs. The signal communicated to the next-generation UEs goes undetected by the legacy UEs.

In accordance with yet other embodiments of this disclosure, another method for managing RACH transmission opportunities is provided. In this example, the method includes broadcasting a first index to legacy UEs and next-generation UEs indicating an initial uplink-downlink configuration for a cell. The method further includes allocating a set of subframes for RACH transmission by the legacy UEs. The method further includes selecting a new uplink-downlink configuration in accordance with a criteria that requires the set of subframes allocated for RACH transmission by legacy UEs to remain configured for uplink transmission. The method further includes sending a second index to next-generation UEs that updates the uplink-downlink configuration to the new uplink-downlink configuration. The second index communicated to the next-generation UEs goes undetected by the legacy UEs.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the present embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

Figure 1:
FIG. 1 illustrates a chart of the various UL/DL configurations of a radio frame for 3GPP LTE networks.

In 3GPP LTE networks (e.g., such as those using frame structure type 2), there may be as many as seven (or more) UL/DL configurations. FIG. 1 illustrates a chart 100 that shows the various UL/DL configurations for a radio frame 110. As shown, the radio frame 110 comprises ten subframes, including a subframe-0, a subframe-1, a subframe-2, a subframe-3, a subframe-4, a subframe-5, a subframe-6, a subframe-7, a subframe-8, and a subframe-9. The subframe-0 and the subframe-5 are statically configured as downlink subframes, while the subframe-2 is statically configured as an uplink sub-frame. Further, the subframe-1 is statically configured as a special subframe, and may include a guard interval as well as uplink and/or downlink transmission opportunities. The subframe-3, the subframe-4, the subframe-7, the subframe-8, and the subframe-9 may be dynamically configured as either uplink subframes or downlink subframes depending on the UL/DL configuration index. The subframe-6 may be dynamically configured as a downlink subframe or a special subframe, depending on the UL/DL configuration index. The 3GPP LTE rel-11 standard is incorporated herein by reference, as if reproduced in its entirety.

Legacy UEs being served by next-generation eNBs may be unable to recognize some updates to the UL/DL configuration. Some problems arising from legacy UE's failure to recognize updates to the UL/DL configuration may be avoided in contention-free access channels (e.g., the physical uplink shared channel (PUSCH), physical downlink shared channel (PDSCH), etc.), as the next-generation eNB may simply refrain from scheduling legacy UEs to subframes that have been dynamically re-allocated from an uplink subframe to a downlink subframe (or vice-versa) since the most recent legacy detection period (e.g., since the most recent 640 ms interval). For instance, if the UL/DL configuration is changed from index-0 to index-1, then the eNB may avoid scheduling legacy UEs to resources in subframe-4 or subframe-9 for a period of time (e.g., for 640 ms or so).

However, legacy UE's inability to recognize updates to the UL/DL configuration may pose a significant problem in contention-based access channels (e.g., the random access channel (RACH)), as UE transmissions in these channels are not directly scheduled/controlled by the eNB. For instance, the RACH channel is an uplink contention-based access channel in which UEs perform unscheduled RACH transmissions by sending a random access preamble for the purpose of initial access or uplink synchronization. The eNB then responds to the UE with a random access response (RAR). After that, the UE performs the first scheduled transmission, and the procedure may be followed by a contention resolution scheme.

As such, a legacy UE who fails to recognize that the UL/DL configuration has been updated may perform a RACH preamble transmission (i.e., an uplink transmission) in a downlink frame, thereby potentially interfering with downlink communications to next-generation UEs.

By way of example, a legacy UE that fails to recognize that an UL/DL configuration has been updated from index-0 to index-1 may perform a RACH transmission in the subframe-4 (which was dynamically reconfigured as a downlink subframe by virtue of the updated UL/DL configuration). As a result, the legacy UE's RACH transmission may interfere with a downlink communication to a next-generation UE in the subframe-4. As discussed herein, RACH transmissions that are performed in downlink subframes may be referred to herein as non-compliant RACH transmissions, as they do not comply with the present UL/DL configuration. Interference produced by non-compliant RACH transmissions may be substantial, particularly when the UL/DL configuration is frequently updated and/or when there are many legacy UEs in a given coverage area. The interference is often more pronounced at the cell-edge, particularly when a next-generation UE is positioned close to a legacy UE making a non-compliant transmission. As such, a mechanism for avoiding non-compliant RACH transmissions by legacy UEs is desired.

Aspects of this disclosure provide various mechanisms for avoiding non-compliant RACH transmissions. One mechanism for avoiding non-compliant RACH transmissions is to restrict UL/DL configuration updates during intermediate periods (e.g., periods in which legacy UEs are configured to check for UL/DL updates). Specifically, UL/DL configuration updates may be restricted to candidate UL/DL configurations that maintain an uplink configuration for all timeslots previously allocated for RACH transmission by legacy UEs. Another mechanism for avoiding non-compliant RACH transmissions is to restrict legacy UE's RACH transmissions to statically configured uplink subframes (e.g., subframe-2 or portions of the special subframe reserved for uplink transmission depending on the preamble format). Specifically with reference to FIG. 1, the subframe-2 in the radio-frame 100 is statically configured for uplink transmission for all UL/DL configuration indexes. By comparison, the subframe-3, the subframe-4, the subframe-7, the subframe-8, and the subframe-9 may be configured for either uplink or downlink transmission depending on which UL/DL configuration index is selected. Hence, non-compliant RACH transmissions may be avoided by restricting RACH transmissions of legacy UEs to the subframe-2.

Figure 2:
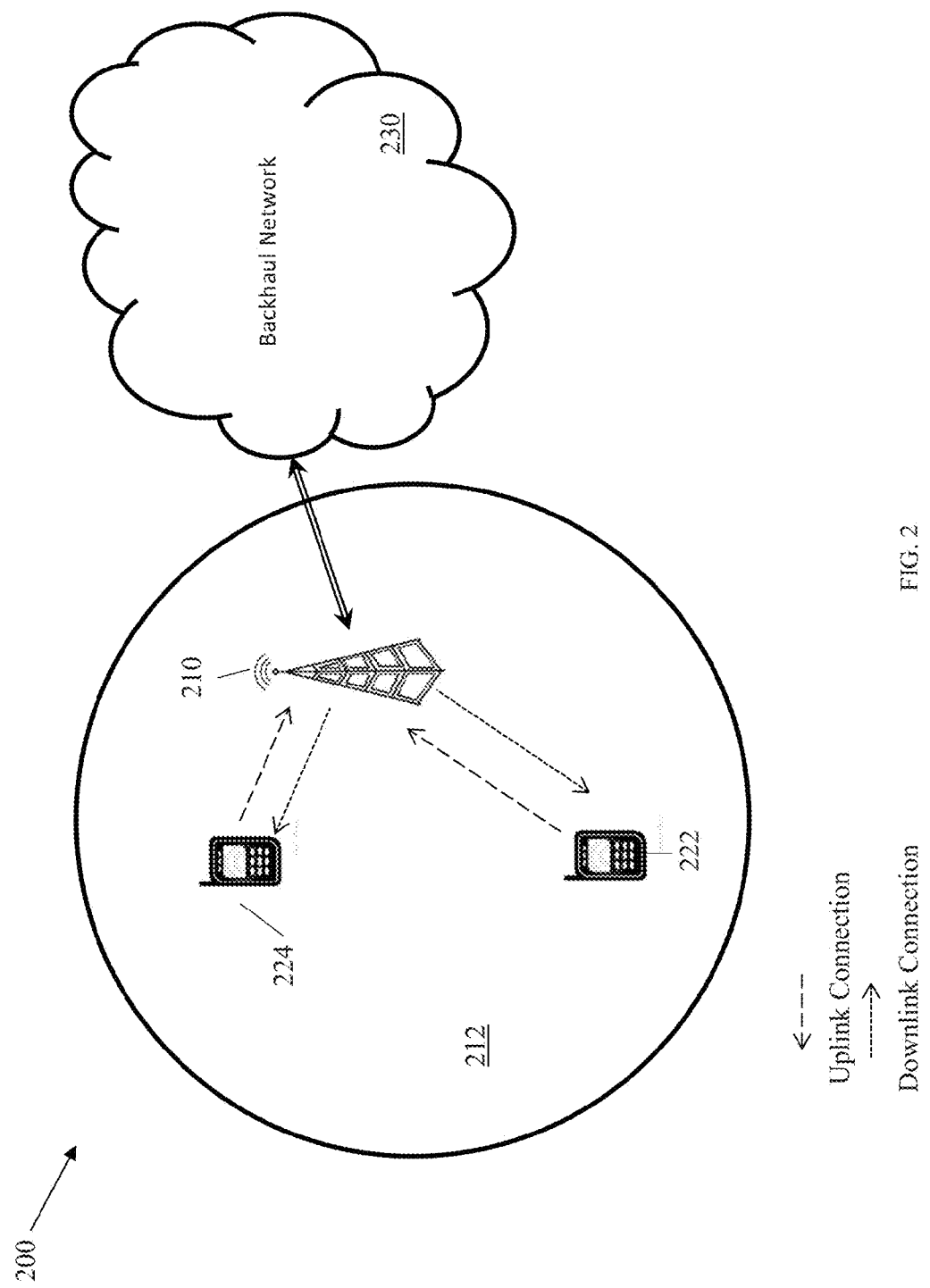
FIG. 2 illustrates a diagram of a network for communicating data.

FIG. 2 illustrates a network 200 for communicating data. The network 200 comprises a base station (eNB) 210 having a coverage area 212, a plurality of user equipments (UEs) 222-224, and a backhaul network 230. The eNB 210 may be any component capable of providing wireless access to the UEs 222-224. The eNB 210 may provide wireless access by, inter alia, establishing an uplink connection (dashed line) and/or a downlink connection (dotted line) with the UEs 222-224. The UEs 222-224 may be any component or collection of components that allow a user to establish a wireless connection for purposes of accessing a network, e.g., the backhaul network 230, and/or for purposes of communicating with other UEs 222-224 in the coverage area 212. The backhaul network 230 may be any component or collection of components that allow data to be exchanged between the eNB 210 and a remote end (not shown). In some embodiments, the network 200 may comprise various other wireless devices, such as relays, femtocells, etc.

Figure 3:
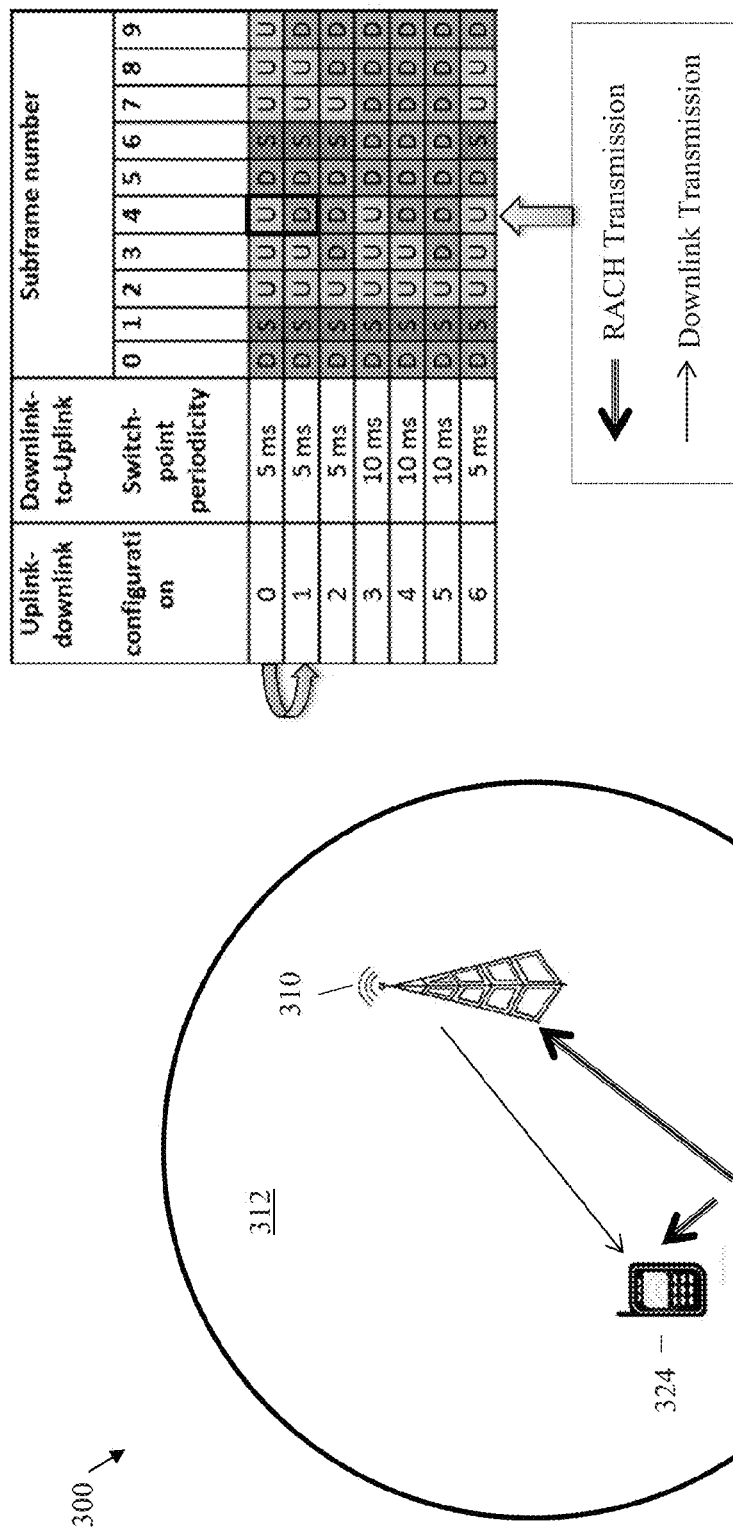
FIG. 3 illustrates an exemplary diagram of how non-compliant RACH transmissions can interfere with a downlink transmission in a network.

FIG. 3 illustrates an example of how a non-compliant RACH transmission can interfere with a downlink transmission in a network 300. The network 300 may be similar in some respects to the network 200, in that the eNB 310 may provide wireless access to UEs 322-324 belonging to two sets of UEs with different capabilities in the coverage area 312. In this example, the UEs 322-324 include a legacy UE 322 and a next-generation UE 324. The legacy UE 322 fails to recognize that the UL/DL configuration has been updated from index-0 to index-1, and consequently performs a non-compliant RACH transmission (thick arrow) in the subframe-4 (which has been dynamically reconfigured as a downlink subframe). As shown, the next-generation UE 324 is scheduled to receive a downlink transmission (thin arrow) during the subframe-4, and consequently the next-generation UE 324 experiences interference from the non-compliant RACH transmission when trying to receive the downlink transmission.

As exemplified in FIG. 3, non-compliant RACH transmissions by legacy UEs can significantly interfere with downlink communications to next-generation UEs, particularly when the non-compliant RACH transmissions have a high transmit-power (as may be the case when the legacy UE is located at the cell edge) and/or originate in-close proximity to the next-generation UE (as may be the case when the legacy UE is positioned nearby the next-generation UE). One way to avoid non-compliant RACH transmissions is to restrict the RACH transmissions opportunities of legacy UEs to statically configured uplink subframes. This may be achieved through assigning appropriate physical RACH (PRACH) configurations to legacy UEs.

Specifically, a PRACH configuration index is assigned to UEs in a wireless coverage area (cell), and is used by the UEs in conjunction with the UL/DL configuration index to locate RACH transmission opportunities. Hence, the RACH transmissions of legacy UEs may be confined to statically configured uplink subframes by assigning legacy UEs PRACH configuration indexes that restricts RACH transmission opportunities to statically configured uplink subframes for all UL/DL configurations.

In practice, locating RACH transmission opportunities in accordance with a PRACH configuration index and UL/DL configuration index is done as described below. The UE may first identify a corresponding quadruple $(f_{RA}, t_{RA}^{(0)}, t_{RA}^{(1)}, t_{RA}^{(2)})$ using the Table 1 (below) [listed as table 5.7.1-4 in 3GPP TS 36.211] in accordance with the PRACH configuration index and UL/DL configuration index combination. For instance, when a PRACH configuration index-0 is combined with a UL/DL configuration index-0, the corresponding quadruple $(f_{RA}, t_{RA}^{(0)}, t_{RA}^{(1)}, t_{RA}^{(2)})$ is (0, 1, 0, 2).

TABLE 1

| PRACH configuration Index | UL/DL configuration 0 | 1 | 2 | 3 | 4 | 5 | 6 |
|---|---|---|---|---|---|---|---|
| 0 | (0, 1, 0, 2) | (0, 1, 0, 1) | (0, 1, 0, 0) | (0, 1, 0, 2) | (0, 1, 0, 1) | (0, 1, 0, 0) | (0, 1, 0, 2) |
| 1 | (0, 2, 0, 2) | (0, 2, 0, 1) | (0, 2, 0, 0) | (0, 2, 0, 2) | (0, 2, 0, 1) | (0, 2, 0, 0) | (0, 2, 0, 2) |
| 2 | (0, 1, 1, 2) | (0, 1, 1, 1) | (0, 1, 1, 0) | (0, 1, 0, 1) | (0, 1, 0, 0) | N/A | (0, 1, 1, 1) |
| 3 | (0, 0, 0, 2) | (0, 0, 0, 1) | (0, 0, 0, 0) | (0, 0, 0, 2) | (0, 0, 0, 1) | (0, 0, 0, 0) | (0, 0, 0, 2) |
| 4 | (0, 0, 1, 2) | (0, 0, 1, 1) | (0, 0, 1, 0) | (0, 0, 0, 1) | (0, 0, 0, 0) | N/A | (0, 0, 1, 1) |
| 5 | (0, 0, 0, 1) | (0, 0, 0, 0) | N/A | (0, 0, 0, 0) | N/A | N/A | (0, 0, 0, 1) |
| 6 | (0, 0, 0, 2) | (0, 0, 0, 1) | (0, 0, 0, 0) | (0, 0, 0, 1) | (0, 0, 0, 0) | (0, 0, 0, 0) | (0, 0, 0, 2) |
| | (0, 0, 1, 2) | (0, 0, 1, 1) | (0, 0, 1, 0) | (0, 0, 0, 2) | (0, 0, 0, 1) | (1, 0, 0, 0) | (0, 0, 1, 1) |
| 7 | (0, 0, 0, 1) | (0, 0, 0, 0) | N/A | (0, 0, 0, 0) | N/A | N/A | (0, 0, 0, 1) |
| | (0, 0, 1, 1) | (0, 0, 1, 0) | | (0, 0, 0, 2) | | | (0, 0, 1, 0) |
| 8 | (0, 0, 0, 0) | N/A | N/A | (0, 0, 0, 0) | N/A | N/A | (0, 0, 0, 0) |
| | (0, 0, 1, 0) | | | (0, 0, 0, 1) | | | (0, 0, 1, 1) |
| 9 | (0, 0, 0, 1) | (0, 0, 0, 0) | (0, 0, 0, 0) | (0, 0, 0, 0) | (0, 0, 0, 0) | (0, 0, 0, 0) | (0, 0, 0, 1) |
| | (0, 0, 0, 2) | (0, 0, 0, 1) | (0, 0, 1, 0) | (0, 0, 0, 1) | (0, 0, 0, 1) | (1, 0, 0, 0) | (0, 0, 0, 2) |
| | (0, 0, 1, 2) | (0, 0, 1, 1) | (1, 0, 0, 0) | (0, 0, 0, 2) | (1, 0, 0, 1) | (2, 0, 0, 0) | (0, 0, 1, 1) |
| 10 | (0, 0, 0, 0) | (0, 0, 0, 1) | (0, 0, 0, 0) | N/A | (0, 0, 0, 0) | N/A | (0, 0, 0, 0) |
| | (0, 0, 1, 0) | (0, 0, 1, 0) | (0, 0, 1, 0) | | (0, 0, 0, 1) | | (0, 0, 0, 2) |
| | (0, 0, 1, 1) | (0, 0, 1, 1) | (1, 0, 1, 0) | | (1, 0, 0, 0) | | (0, 0, 1, 0) |
| 11 | N/A | (0, 0, 0, 0) | N/A | N/A | N/A | N/A | (0, 0, 0, 1) |
| | | (0, 0, 0, 1) | | | | | (0, 0, 1, 0) |
| | | (0, 0, 1, 0) | | | | | (0, 0, 1, 1) |
| 12 | (0, 0, 0, 1) | (0, 0, 0, 0) | (0, 0, 0, 0) | (0, 0, 0, 0) | (0, 0, 0, 0) | (0, 0, 0, 0) | (0, 0, 0, 1) |
| | (0, 0, 0, 2) | (0, 0, 0, 1) | (0, 0, 1, 0) | (0, 0, 0, 1) | (0, 0, 0, 1) | (1, 0, 0, 0) | (0, 0, 0, 2) |
| | (0, 0, 1, 1) | (0, 0, 1, 0) | (1, 0, 0, 0) | (0, 0, 0, 2) | (1, 0, 0, 0) | (2, 0, 0, 0) | (0, 0, 1, 0) |
| | (0, 0, 1, 2) | (0, 0, 1, 1) | (1, 0, 1, 0) | (1, 0, 0, 2) | (1, 0, 0, 1) | (3, 0, 0, 0) | (0, 0, 1, 1) |
| 13 | (0, 0, 0, 0) | N/A | N/A | (0, 0, 0, 0) | N/A | N/A | (0, 0, 0, 0) |
| | (0, 0, 0, 2) | | | (0, 0, 0, 1) | | | (0, 0, 0, 1) |
| | (0, 0, 1, 0) | | | (0, 0, 0, 2) | | | (0, 0, 0, 2) |
| | (0, 0, 1, 2) | | | (1, 0, 0, 1) | | | (0, 0, 1, 1) |
| 14 | (0, 0, 0, 0) | N/A | N/A | (0, 0, 0, 0) | N/A | N/A | (0, 0, 0, 0) |
| | (0, 0, 0, 1) | | | (0, 0, 0, 1) | | | (0, 0, 0, 2) |
| | (0, 0, 1, 0) | | | (0, 0, 0, 2) | | | (0, 0, 1, 0) |
| | (0, 0, 1, 1) | | | (1, 0, 0, 0) | | | (0, 0, 1, 1) |
| 15 | (0, 0, 0, 0) | (0, 0, 0, 0) | (0, 0, 0, 0) | (0, 0, 0, 0) | (0, 0, 0, 0) | (0, 0, 0, 0) | (0, 0, 0, 0) |
| | (0, 0, 0, 1) | (0, 0, 0, 1) | (0, 0, 1, 0) | (0, 0, 0, 1) | (0, 0, 0, 1) | (1, 0, 0, 0) | (0, 0, 0, 1) |
| | (0, 0, 0, 2) | (0, 0, 1, 0) | (1, 0, 0, 0) | (0, 0, 0, 2) | (1, 0, 0, 0) | (2, 0, 0, 0) | (0, 0, 0, 2) |
| | (0, 0, 1, 1) | (0, 0, 1, 1) | (1, 0, 1, 0) | (1, 0, 0, 1) | (1, 0, 0, 1) | (3, 0, 0, 0) | (0, 0, 1, 0) |
| | (0, 0, 1, 2) | (1, 0, 0, 1) | (2, 0, 0, 0) | (1, 0, 0, 2) | (2, 0, 0, 1) | (4, 0, 0, 0) | (0, 0, 1, 1) |
| 16 | (0, 0, 0, 1) | (0, 0, 0, 0) | (0, 0, 0, 0) | (0, 0, 0, 0) | (0, 0, 0, 0) | N/A | N/A |
| | (0, 0, 0, 2) | (0, 0, 0, 1) | (0, 0, 1, 0) | (0, 0, 0, 1) | (0, 0, 0, 1) | | |
| | (0, 0, 1, 0) | (0, 0, 1, 0) | (1, 0, 0, 0) | (0, 0, 0, 2) | (1, 0, 0, 0) | | |
| | (0, 0, 1, 1) | (0, 0, 1, 1) | (1, 0, 1, 0) | (1, 0, 0, 0) | (1, 0, 0, 1) | | |
| | (0, 0, 1, 2) | (1, 0, 1, 1) | (2, 0, 1, 0) | (1, 0, 0, 2) | (2, 0, 0, 0) | | |
| 17 | (0, 0, 0, 0) | (0, 0, 0, 0) | N/A | (0, 0, 0, 0) | N/A | N/A | N/A |
| | (0, 0, 0, 1) | (0, 0, 0, 1) | | (0, 0, 0, 1) | | | |
| | (0, 0, 0, 2) | (0, 0, 1, 0) | | (0, 0, 0, 2) | | | |
| | (0, 0, 1, 0) | (0, 0, 1, 1) | | (1, 0, 0, 0) | | | |
| | (0, 0, 1, 2) | (1, 0, 0, 0) | | (1, 0, 0, 1) | | | |
| 18 | (0, 0, 0, 0) | (0, 0, 0, 0) | (0, 0, 0, 0) | (0, 0, 0, 0) | (0, 0, 0, 0) | (0, 0, 0, 0) | (0, 0, 0, 0) |
| | (0, 0, 0, 1) | (0, 0, 0, 1) | (0, 0, 1, 0) | (0, 0, 0, 1) | (0, 0, 0, 1) | (1, 0, 0, 0) | (0, 0, 0, 1) |
| | (0, 0, 0, 2) | (0, 0, 1, 0) | (1, 0, 0, 0) | (0, 0, 0, 2) | (1, 0, 0, 0) | (2, 0, 0, 0) | (0, 0, 0, 2) |
| | (0, 0, 1, 0) | (0, 0, 1, 1) | (1, 0, 1, 0) | (1, 0, 0, 0) | (1, 0, 0, 1) | (3, 0, 0, 0) | (0, 0, 1, 0) |
| | (0, 0, 1, 1) | (1, 0, 0, 1) | (2, 0, 0, 0) | (1, 0, 0, 1) | (2, 0, 0, 0) | (4, 0, 0, 0) | (0, 0, 1, 1) |
| | (0, 0, 1, 2) | (1, 0, 1, 1) | (2, 0, 1, 0) | (1, 0, 0, 2) | (2, 0, 0, 1) | (5, 0, 0, 0) | (1, 0, 0, 2) |
| 19 | N/A | (0, 0, 0, 0) | N/A | N/A | N/A | N/A | (0, 0, 0, 0) |
| | | (0, 0, 0, 1) | | | | | (0, 0, 0, 1) |
| | | (0, 0, 1, 0) | | | | | (0, 0, 0, 2) |
| | | (0, 0, 1, 1) | | | | | (0, 0, 1, 0) |
| | | (1, 0, 0, 0) | | | | | (0, 0, 1, 1) |
| | | (1, 0, 1, 0) | | | | | (1, 0, 1, 1) |

TABLE 1-continued

| PRACH configuration Index | UL/DL configuration | | | | | | |
|---|---|---|---|---|---|---|---|
| | 0 | 1 | 2 | 3 | 4 | 5 | 6 |
| 20/30 | (0, 1, 0, 1) | (0, 1, 0, 0) | N/A | (0, 1, 0, 1) | (0, 1, 0, 0) | N/A | (0, 1, 0, 1) |
| 21/31 | (0, 2, 0, 1) | (0, 2, 0, 0) | N/A | (0, 2, 0, 1) | (0, 2, 0, 0) | N/A | (0, 2, 0, 1) |
| 22/32 | (0, 1, 1, 1) | (0, 1, 1, 0) | N/A | N/A | N/A | N/A | (0, 1, 1, 0) |
| 23/33 | (0, 0, 0, 1) | (0, 0, 0, 0) | N/A | (0, 0, 0, 1) | (0, 0, 0, 0) | N/A | (0, 0, 0, 1) |
| 24/34 | (0, 0, 1, 1) | (0, 0, 1, 0) | N/A | N/A | N/A | N/A | (0, 0, 1, 0) |
| 25/35 | (0, 0, 0, 1) | (0, 0, 0, 0) | N/A | (0, 0, 0, 1) | (0, 0, 0, 0) | N/A | (0, 0, 0, 1) |
| | (0, 0, 1, 1) | (0, 0, 1, 0) | | (1, 0, 0, 1) | (1, 0, 0, 0) | | (0, 0, 1, 0) |
| 26/36 | (0, 0, 0, 1) | (0, 0, 0, 0) | | (0, 0, 0, 1) | (0, 0, 0, 0) | | (0, 0, 0, 1) |
| | (0, 0, 1, 1) | (0, 0, 1, 0) | N/A | (1, 0, 0, 1) | (1, 0, 0, 0) | N/A | (0, 0, 1, 0) |
| | (1, 0, 0, 1) | (1, 0, 0, 0) | | (2, 0, 0, 1) | (2, 0, 0, 0) | | (1, 0, 0, 1) |
| 27/37 | (0, 0, 0, 1) | (0, 0, 0, 0) | | (0, 0, 0, 1) | (0, 0, 0, 0) | | (0, 0, 0, 1) |
| | (0, 0, 1, 1) | (0, 0, 1, 0) | N/A | (1, 0, 0, 1) | (1, 0, 0, 0) | N/A | (0, 0, 1, 0) |
| | (1, 0, 0, 1) | (1, 0, 0, 0) | | (2, 0, 0, 1) | (2, 0, 0, 0) | | (1, 0, 0, 1) |
| | (1, 0, 1, 1) | (1, 0, 1, 0) | | (3, 0, 0, 1) | (3, 0, 0, 0) | | (1, 0, 1, 0) |
| 28/38 | (0, 0, 0, 1) | (0, 0, 0, 0) | | (0, 0, 0, 1) | (0, 0, 0, 0) | | (0, 0, 0, 1) |
| | (0, 0, 1, 1) | (0, 0, 1, 0) | | (1, 0, 0, 1) | (1, 0, 0, 0) | | (0, 0, 1, 0) |
| | (1, 0, 0, 1) | (1, 0, 0, 0) | N/A | (2, 0, 0, 1) | (2, 0, 0, 0) | N/A | (1, 0, 0, 1) |
| | (1, 0, 1, 1) | (1, 0, 1, 0) | | (3, 0, 0, 1) | (3, 0, 0, 0) | | (1, 0, 1, 0) |
| | (2, 0, 0, 1) | (2, 0, 0, 0) | | (4, 0, 0, 1) | (4, 0, 0, 0) | | (2, 0, 0, 1) |
| 29/39 | (0, 0, 0, 1) | (0, 0, 0, 0) | | (0, 0, 0, 1) | (0, 0, 0, 0) | | (0, 0, 0, 1) |
| | (0, 0, 1, 1) | (0, 0, 1, 0) | | (1, 0, 0, 1) | (1, 0, 0, 0) | | (0, 0, 1, 0) |
| | (1, 0, 0, 1) | (1, 0, 0, 0) | N/A | (2, 0, 0, 1) | (2, 0, 0, 0) | N/A | (1, 0, 0, 1) |
| | (1, 0, 1, 1) | (1, 0, 1, 0) | | (3, 0, 0, 1) | (3, 0, 0, 0) | | (1, 0, 1, 0) |
| | (2, 0, 0, 1) | (2, 0, 0, 0) | | (4, 0, 0, 1) | (4, 0, 0, 0) | | (2, 0, 0, 1) |
| | (2, 0, 1, 1) | (2, 0, 1, 0) | | (5, 0, 0, 1) | (5, 0, 0, 0) | | (2, 0, 1, 0) |
| 40 | (0, 1, 0, 0) | N/A | N/A | (0, 1, 0, 0) | N/A | N/A | (0, 1, 0, 0) |
| 41 | (0, 2, 0, 0) | N/A | N/A | (0, 2, 0, 0) | N/A | N/A | (0, 2, 0, 0) |
| 42 | (0, 1, 1, 0) | N/A | N/A | N/A | N/A | N/A | N/A |
| 43 | (0, 0, 0, 0) | N/A | N/A | (0, 0, 0, 0) | N/A | N/A | (0, 0, 0, 0) |
| 44 | (0, 0, 1, 0) | N/A | N/A | N/A | N/A | N/A | N/A |
| 45 | (0, 0, 0, 0) | N/A | N/A | (0, 0, 0, 0) | N/A | N/A | (0, 0, 0, 0) |
| | (0, 0, 1, 0) | | | (1, 0, 0, 0) | | | (1, 0, 0, 0) |
| 46 | (0, 0, 0, 0) | | | (0, 0, 0, 0) | | | (0, 0, 0, 0) |
| | (0, 0, 1, 0) | N/A | N/A | (1, 0, 0, 0) | N/A | N/A | (1, 0, 0, 0) |
| | (1, 0, 0, 0) | | | (2, 0, 0, 0) | | | (2, 0, 0, 0) |
| 47 | (0, 0, 0, 0) | | | (0, 0, 0, 0) | | | (0, 0, 0, 0) |
| | (0, 0, 1, 0) | N/A | N/A | (1, 0, 0, 0) | N/A | N/A | (1, 0, 0, 0) |
| | (1, 0, 0, 0) | | | (2, 0, 0, 0) | | | (2, 0, 0, 0) |
| | (1, 0, 1, 0) | | | (3, 0, 0, 0) | | | (3, 0, 0, 0) |
| 48 | (0, 1, 0, *) | (0, 1, 0, *) | (0, 1, 0, *) | (0, 1, 0, *) | (0, 1, 0, *) | (0, 1, 0, *) | (0, 1, 0, *) |
| 49 | (0, 2, 0, *) | (0, 2, 0, *) | (0, 2, 0, *) | (0, 2, 0, *) | (0, 2, 0, *) | (0, 2, 0, *) | (0, 2, 0, *) |
| 50 | (0, 1, 1, *) | (0, 1, 1, *) | (0, 1, 1, *) | N/A | N/A | N/A | (0, 1, 1, *) |
| 51 | (0, 0, 0, *) | (0, 0, 0, *) | (0, 0, 0, *) | (0, 0, 0, *) | (0, 0, 0, *) | (0, 0, 0, *) | (0, 0, 0, *) |
| 52 | (0, 0, 1, *) | (0, 0, 1, *) | (0, 0, 1, *) | N/A | N/A | N/A | (0, 0, 1, *) |
| 53 | (0, 0, 0, *) | (0, 0, 0, *) | (0, 0, 0, *) | (0, 0, 0, *) | (0, 0, 0, *) | (0, 0, 0, *) | (0, 0, 0, *) |
| | (0, 0, 1, *) | (0, 0, 1, *) | (0, 0, 1, *) | (1, 0, 0, *) | (1, 0, 0, *) | (1, 0, 0, *) | (0, 0, 1, *) |
| 54 | (0, 0, 0, *) | (0, 0, 0, *) | (0, 0, 0, *) | (0, 0, 0, *) | (0, 0, 0, *) | (0, 0, 0, *) | (0, 0, 0, *) |
| | (0, 0, 1, *) | (0, 0, 1, *) | (0, 0, 1, *) | (1, 0, 0, *) | (1, 0, 0, *) | (1, 0, 0, *) | (0, 0, 1, *) |
| | (1, 0, 0, *) | (1, 0, 0, *) | (1, 0, 0, *) | (2, 0, 0, *) | (2, 0, 0, *) | (2, 0, 0, *) | (1, 0, 0, *) |
| 55 | (0, 0, 0, *) | (0, 0, 0, *) | (0, 0, 0, *) | (0, 0, 0, *) | (0, 0, 0, *) | (0, 0, 0, *) | (0, 0, 0, *) |
| | (0, 0, 1, *) | (0, 0, 1, *) | (0, 0, 1, *) | (1, 0, 0, *) | (1, 0, 0, *) | (1, 0, 0, *) | (0, 0, 1, *) |
| | (1, 0, 0, *) | (1, 0, 0, *) | (1, 0, 0, *) | (2, 0, 0, *) | (2, 0, 0, *) | (2, 0, 0, *) | (1, 0, 0, *) |
| | (1, 0, 1, *) | (1, 0, 1, *) | (1, 0, 1, *) | (3, 0, 0, *) | (3, 0, 0, *) | (3, 0, 0, *) | (1, 0, 1, *) |
| 56 | (0, 0, 0, *) | (0, 0, 0, *) | (0, 0, 0, *) | (0, 0, 0, *) | (0, 0, 0, *) | (0, 0, 0, *) | (0, 0, 0, *) |
| | (0, 0, 1, *) | (0, 0, 1, *) | (0, 0, 1, *) | (1, 0, 0, *) | (1, 0, 0, *) | (1, 0, 0, *) | (0, 0, 1, *) |
| | (1, 0, 0, *) | (1, 0, 0, *) | (1, 0, 0, *) | (2, 0, 0, *) | (2, 0, 0, *) | (2, 0, 0, *) | (1, 0, 0, *) |
| | (1, 0, 1, *) | (1, 0, 1, *) | (1, 0, 1, *) | (3, 0, 0, *) | (3, 0, 0, *) | (3, 0, 0, *) | (1, 0, 1, *) |
| | (2, 0, 0, *) | (2, 0, 0, *) | (2, 0, 0, *) | (4, 0, 0, *) | (4, 0, 0, *) | (4, 0, 0, *) | (2, 0, 0, *) |
| 57 | (0, 0, 0, *) | (0, 0, 0, *) | (0, 0, 0, *) | (0, 0, 0, *) | (0, 0, 0, *) | (0, 0, 0, *) | (0, 0, 0, *) |
| | (0, 0, 1, *) | (0, 0, 1, *) | (0, 0, 1, *) | (1, 0, 0, *) | (1, 0, 0, *) | (1, 0, 0, *) | (0, 0, 1, *) |
| | (1, 0, 0, *) | (1, 0, 0, *) | (1, 0, 0, *) | (2, 0, 0, *) | (2, 0, 0, *) | (2, 0, 0, *) | (1, 0, 0, *) |
| | (1, 0, 1, *) | (1, 0, 1, *) | (1, 0, 1, *) | (3, 0, 0, *) | (3, 0, 0, *) | (3, 0, 0, *) | (1, 0, 1, *) |
| | (2, 0, 0, *) | (2, 0, 0, *) | (2, 0, 0, *) | (4, 0, 0, *) | (4, 0, 0, *) | (4, 0, 0, *) | (2, 0, 0, *) |
| | (2, 0, 1, *) | (2, 0, 1, *) | (2, 0, 1, *) | (5, 0, 0, *) | (5, 0, 0, *) | (5, 0, 0, *) | (2, 0, 1, *) |
| 58 | N/A | N/A | N/A | N/A | N/A | N/A | N/A |
| 59 | N/A | N/A | N/A | N/A | N/A | N/A | N/A |
| 60 | N/A | N/A | N/A | N/A | N/A | N/A | N/A |
| 61 | N/A | N/A | N/A | N/A | N/A | N/A | N/A |
| 62 | N/A | N/A | N/A | N/A | N/A | N/A | N/A |
| 63 | N/A | N/A | N/A | N/A | N/A | N/A | N/A |

After finding the corresponding quadruple ($f_{RA}, t_{RA}^{(0)}, t_{RA}^{(1)}, t_{RA}^{(2)}$), the UE then locates the RACH opportunities using an equation/formula that is determined in accordance with the preamble format being used. For preamble formats 0-3, the RACH opportunities are located in accordance with the following equation:

$$n_{PRB}^{RA} = \begin{cases} n_{PRB\ offset}^{RA} + 6\left\lfloor \dfrac{f_{RA}}{2} \right\rfloor, & \text{if } f_{RA} \bmod 2 = 0 \\ N_{RB}^{UL} - 6 - n_{PRB\ offset}^{RA} - 6\left\lfloor \dfrac{f_{RA}}{2} \right\rfloor, & \text{otherwise,} \end{cases}$$

where $N_{RB}^{UL}$ is the number of uplink resource blocks, $n_{PRB}^{RA}$ is the first physical resource block allocated to the PRACH opportunity considered and where the parameter prach-FrequencyOffset, $n_{PRB\ offset}^{RA}$ is the first physical resource block available for PRACH expressed as a physical resource block number configured by higher layers and fulfilling $0 \le n_{PRBoffset}^{RA} \le N_{RB}^{UL} - 6$.

For preamble format 4, the RACH opportunities are located in accordance with the following equation:

$$n_{PRB}^{RA} = \begin{cases} 6 f_{RA}, & \text{if } ((n_f \bmod 2) \times (2 - N_{SP}) + t_{RA}^{(1)}) \bmod 2 = 0 \\ N_{RB}^{UL} - 6(f_{RA} + 1), & \text{otherwise,} \end{cases}$$

where $n_f$ is the system frame number and where $N_{SP}$ is the number of DL to UL switch points within the radio frame.

For purposes of clarity and concision, this disclosure will use the PRACH index-x to indicate a set of RACH opportunities (e.g., the ones that are restricted to statically configured uplink subframes (e.g., subframe-2)), and the PRACH index-y to indicate another set of RACH opportunities that may be permitted in dynamically configured uplink subframes (e.g., subframe-3, subframe-4, and subframe-7 through subframe-9).

Figure 4:
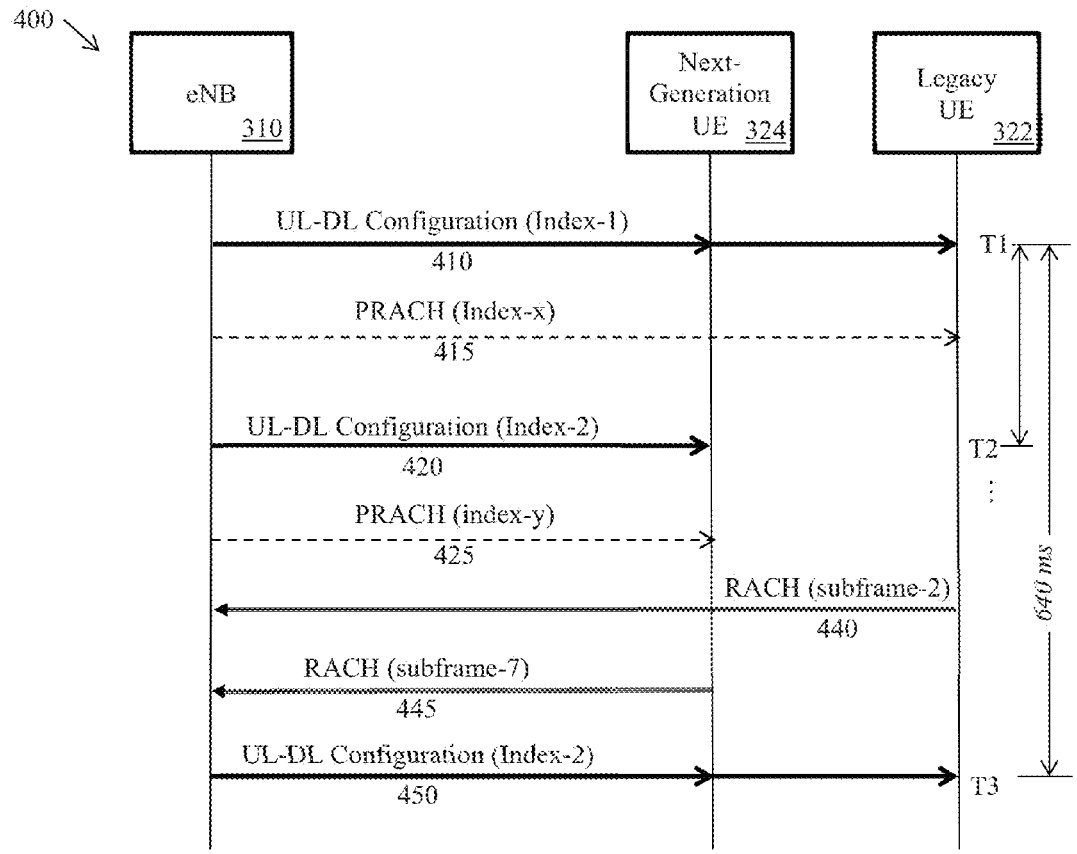
FIG. 4 illustrates a protocol diagram of an embodiment communications sequence for managing RACH transmission opportunities.

FIG. 4 illustrates a protocol diagram of a communications sequence 400 for managing RACH transmission opportunities. The communications sequence 400 begins when the eNB 310 sends an UL/DL configuration message 410 that indicates an UL/DL configuration index-1. The UL/DL configuration message 410 may be communicated in a system information block (SIB) field of a downlink channel, e.g., PDSCH with corresponding DCI in physical downlink control channel (PDCCH). Notably, the UL/DL configuration message 410 is communicated at a first time period (T1) in which the legacy UE 322 is configured to detect UL/DL configuration messages, and therefore the UL/DL configuration message 410 is detected/received by both the next-generation UE 324 and the legacy UE 322. Next, the eNB 310 sends a PRACH message 415 to the legacy UE 322. The PRACH message 415 assigns a PRACH index-x to the legacy UE 322. In some embodiments, the PRACH index-x restricts the legacy UE's 322 RACH transmission opportunities to statically configured uplink subframes (e.g., subframe-2). In other embodiments, the subframes configured for RACH transmission opportunities by the UE 322 restrict future changes in the UL-DL configuration index. At a second time interval (T2), the eNB 310 communicates an UL/DL configuration message 420 in the downlink channel (e.g., the PDCCH) that indicates an UL/DL configuration index-2. Notably, the UL/DL configuration message 420 may be communicated at a time in which the legacy UE 322 is not configured to detect UL/DL configuration indexes, and consequently the UL/DL configuration update may go unnoticed by the legacy UE 322. As a result, the legacy UE 322 may mistakenly believe that the UL/DL configuration remains set to index-1 after the UL/DL configuration is updated to index-2. In some embodiments, updates to the UL/DL configuration index may be limited by the subframes configured for RACH transmission opportunities by the legacy UE 322 by the PRACH message 415.

Thereafter, the eNB 310 sends a PRACH message 425 to the next-generation UE 324. The PRACH message 425 may assign a PRACH index-y (or allow the use of both PRACH index-x and index-y) to the next-generation UE 324. In some embodiments, the PRACH index-y may allow the next-generation UE 324 to perform RACH transmissions in one or more dynamically configured uplink subframes (e.g., subframe-7). For instance, in some embodiments the PRACH index-x may be any PRACH configuration index that limits RACH transmission opportunities to statically configured uplink subframes (e.g., the subframe-2), while the PRACH index-y may be any PRACH configuration index, including those that permit RACH transmissions in dynamically configured uplink subframes (e.g., the subframe-3, the subframe-4, etc.).

The legacy UE 322 is assigned a PRACH index-x (which may limit the RACH transmissions to statically configured uplink subframes, e.g., the subframe-2), and consequently performs the RACH transmission 440 in the corresponding subframes (e.g., subframe-2). Conversely, the next-generation UE 324 is assigned a PRACH index-y (which allows RACH transmissions in dynamically configured uplink subframes), and consequently performs a RACH transmission 445 in the subframe-7. Notably, the legacy UE 322 may have potentially transmitted a non-compliant RACH transmission in the subframe-3, the subframe-4, or the subframe-8 had the legacy UE 322 been assigned a PRACH index-y. Hence, the potential for non-compliant RACH transmissions is avoided by restricting RACH transmissions opportunities of the legacy UE 322 to statically configured uplink subframes (e.g., the subframe-2).

Figure 5:
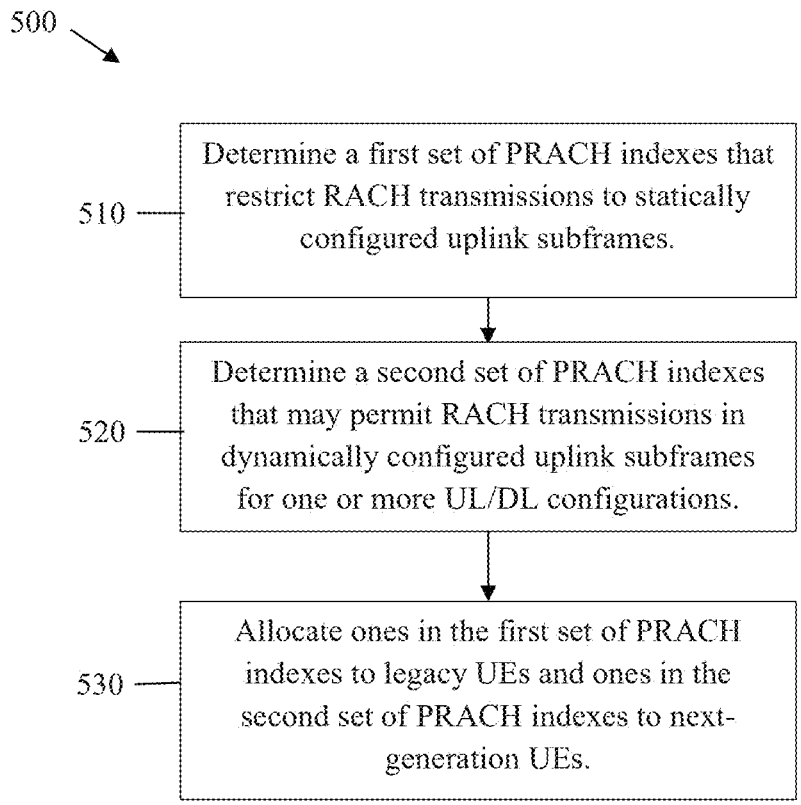
FIG. 5 illustrates a flowchart of an embodiment method for managing RACH transmission opportunities.

In some embodiments, PRACH configuration indexes and/or UL/DL configuration indexes may be communicated via SIB signaling. For instance, a PRACH configuration index assigned to legacy UEs may be communicated via a field in an SIB signal. The SIB may include a second field that indicates whether the PRACH configuration index allocated to legacy UEs is also allocated to next-generation UEs. In embodiments, the PRACH configuration index for next-generations UEs may be communicated by a different field within the SIB signaling used to communicate the PRACH configuration index for the legacy UEs, or alternatively by a different SIB signaling. In other embodiments, the PRACH configuration index for next-generations UEs may be communicated by a dedicated Radio Resource Control (RRC) signal. FIG. 5 illustrates a method 500 for managing RACH transmission opportunities. The method 500 begins at step 510, where the eNB determines a first set of PRACH indexes that restrict RACH transmissions to statically configured uplink subframes. Next, the method proceeds to step 520, where the eNB determines a second set of PRACH indexes that can include RACH transmission opportunities in dynamically configured uplink subframes for one or more UL/DL configurations. The actual RACH transmission resources can be obtained by combining the second index and a set of system parameters including one or more of a cell-ID, a system frame number, a number of DL to UL switch points within the radio frame, a first set of RACH configurations, TDD configurations, and number of resource blocks in UL. Thereafter, the method 500 proceeds to step 530, where the eNB allocates PRACH indexes belonging to the first set of PRACH indexes to legacy UEs. Optionally, the eNB may also allocate PRACH indexes belonging to the second set of PRACH indexes to next-generation UEs. Notably, in some cases it may be desirable to allocate PRACH indexes belonging to the first set of PRACH indexes to next-generation UEs. As an additional benefit, limiting RACH transmissions by legacy UEs to statically configured uplink subframes may also reduce inter-cell-interference between neighboring cells that may use different UL/DL configurations.

As it can be seen from Table 1, the RACH opportunities for legacy UEs are limited due to using statically configured UL subframes including UL portion of the special subframe. For example, PRACH index 48 provides one RACH opportunity every 20 ms in the UL portion of the special subframe. Therefore, RACH for legacy and next-generation UEs may have different requirements. For instance, the time-frequency RACH resources assigned to these two sets may be different leading to different interference and noise levels. Therefore, the eNB may decide to use two sets of RACH parameters: one RACH parameter set for each set of UEs (e.g., legacy and next-generation). The RACH parameter set may include initial RACH transmission power offset and contention-based/contention-free signature grouping.

Figure 6:
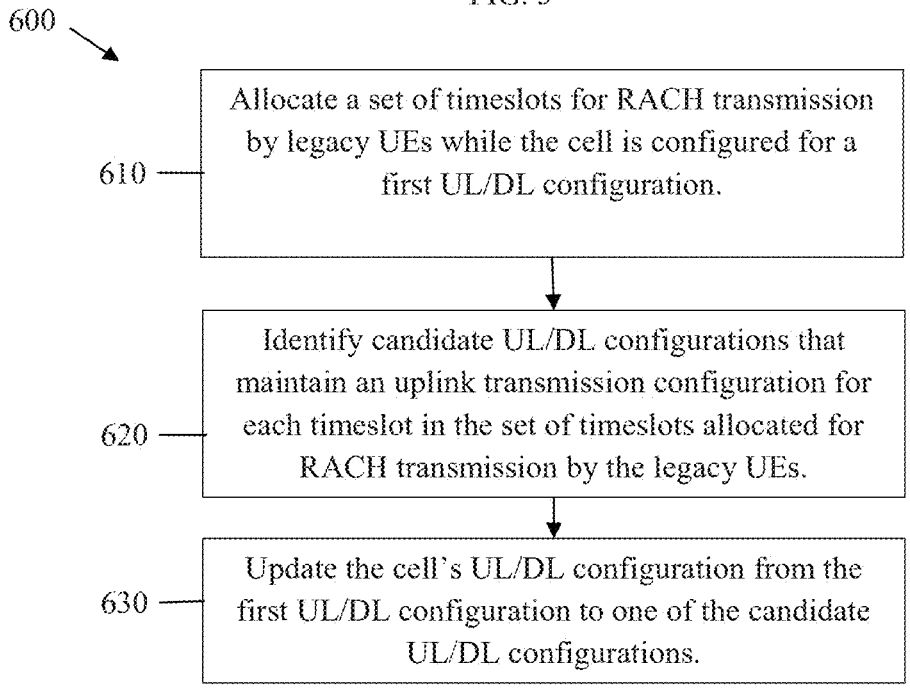
FIG. 6 illustrates a flowchart of another embodiment method for managing RACH transmission opportunities.

FIG. 6 illustrates a method 600 for managing RACH transmission opportunities. The method 600 begins at step 610, where the eNB allocates a first set of timeslots for RACH transmission by legacy UEs when the cell is configured for a first UL/DL configuration. Next, the method proceeds to step 620, where the eNB identifies candidate UL/DL configurations that maintain an uplink transmission configuration for each timeslot in the set of timeslots allocated for RACH transmission by the legacy UEs. For instance, if the eNB allocated the subframe-4 for RACH transmission by the legacy UEs while the cell was configured for UL/DL configuration index-0, then the candidate UL/DL configurations would include UL/DL configuration index-3 and configuration index-6 (as those are the only configuration indexes that maintain the subframe-4 configured for uplink transmission). Thereafter, the method 600 proceeds to step 630, where the eNB updates the cell's UL/DL configuration from the first UL/DL configuration to one of the candidate UL/DL configurations. The UL/DL configuration of step 630 may occur during an intermediate period (e.g., a period between those in which legacy UEs are configured to check for UL/DL updates).

While much of this disclosure have been discussed in the context of networks comprising two classes of UEs having different capabilities, namely legacy UEs and next-generation UEs, aspects of this disclosure are not so limited. For instance, aspects of this disclosure can be applied to networks comprising three or more classifications of UEs each of which having different capabilities (e.g., first generation UEs, second generation UEs, third generation UEs, etc.).

Figure 7:
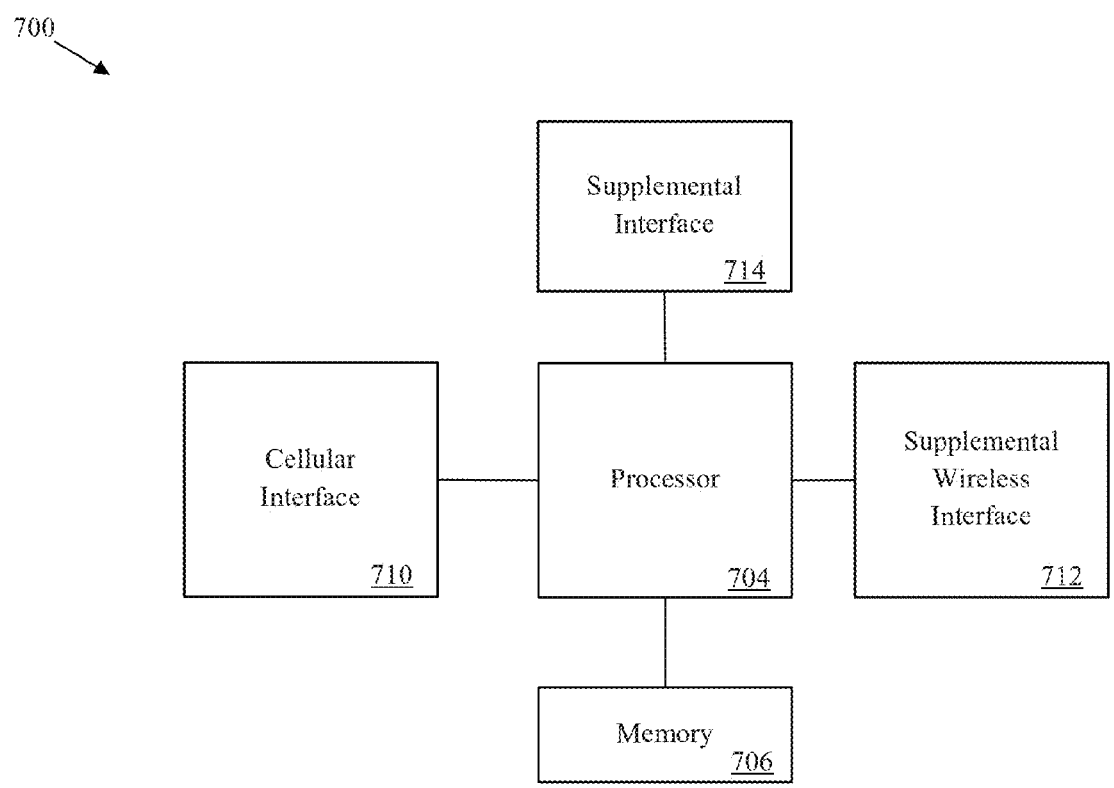
FIG. 7 illustrates a block diagram of an embodiment communications device.

FIG. 7 illustrates a block diagram of an embodiment of a communications device 700, which may be equivalent to one or more devices (e.g., UEs, eNBs, etc.) discussed above. The communications device 700 may include a processor 704, a memory 706, a cellular interface 710, a supplemental wireless interface 712, and a supplemental interface 714, which may (or may not) be arranged as shown in FIG. 7. The processor 704 may be any component capable of performing computations and/or other processing related tasks, and the memory 706 may be any component capable of storing programming and/or instructions for the processor 704. The cellular interface 710 may be any component or collection of components that allows the communications device 700 to communicate using a cellular signal, and may be used to receive and/or transmit information over a cellular connection of a cellular network. The supplemental wireless interface 712 may be any component or collection of components that allows the communications device 700 to communicate via a non-cellular wireless protocol, such as a Wi-Fi or Bluetooth protocol, or a control protocol. The supplemental interface 714 may be component or collection of components that allows the communications device 700 to communicate via a supplemental protocol, including wire-line protocols. In embodiments, the supplemental interface 714 may allow the device 700 to communicate with a backhaul network.

Although the present disclosure and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure that processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed:

1. A method for managing random access channel (RACH) transmission opportunities in a cell of a network, the method comprising:

transmitting a first signal to a set of user equipments (UEs), the first signal assigning a first sub-set of subframes for RACH transmission by legacy UEs in the set of UEs, the first sub-set of subframes being configured as uplink subframes under an initial frame configuration, wherein the first sub-set of subframes includes at least one subframe that is configured as a downlink subframe under one or more frame configurations in a set of candidate frame configurations;

transmitting a second signal to next-generation UEs in the set of UEs, the second signal assigning a second sub-set of subframes for RACH transmission opportunities by the next-generation UEs, the second sub-set of subframes being configured as uplink subframes under the initial frame configuration;

restricting selection of an updated frame configuration to a subset of candidate frame configurations that maintain the first sub-set of subframes as uplink subframes, the subset of candidate frame configurations excluding the one or more frame configurations that configure at least one subframe in the first sub-set of subframes as a downlink subframe; and communicating an index associated with the updated frame configuration to the next-generation UEs, the updated frame configuration reconfiguring at least some uplink subframes in the second sub-set of subframes as downlink subframes without reconfiguring any subframes in the first sub-set of subframes such that uplink subframes allocated for RACH transmissions by the legacy UEs remain configured for uplink transmission, wherein the index goes undetected by the first sub-set of UEs.

2. The method of claim 1, wherein the next-generation UEs are configured to check for an updated uplink-downlink configuration index more frequently than the legacy UEs.

3. The method of claim 1, wherein the second sub-set of subframes allocated for RACH transmission opportunities by the next-generation UEs include at least some RACH transmission opportunities excluded from the first sub-set of subframes allocated for RACH transmission opportunities by the legacy UEs.

4. The method of claim 1 further comprising:
communicating a first set of RACH parameters to the legacy UEs and a second set of RACH parameters to the next-generation UEs, wherein at least one of the first set of RACH parameters and the second set of RACH parameters includes initial RACH transmission power offset and contention-based/contention-free signature grouping.

5. The method of claim 1, wherein the index indicates a transition from the initial frame configuration to the updated frame configuration.

6. The method of claim 5, wherein the first sub-set of subframes span a first plurality of timeslots configured for uplink transmission when the cell operates in accordance with the initial frame configuration, and
wherein the first plurality of timeslots remain configured for uplink transmission when the cell transitions from the initial frame configuration to the updated frame configuration.

7. The method of claim 6, wherein the second sub-set of subframes span a second plurality of timeslots configured for uplink transmission when the cell operates in accordance with the initial frame configuration, and
wherein at least some of the second plurality of timeslots are re-configured for downlink transmission when the cell transitions from the initial frame configuration to the updated frame configuration.

8. The method of claim 7, wherein communicating the index reallocates a third set of RACH transmission opportunities to the next-generation UEs, wherein the third set of RACH transmission opportunities do not span any timeslots configured for downlink transmission when the cell operates in accordance with the updated frame uplink downlink configuration.

9. The method of claim 8, wherein the next-generation UEs identify the third set of RACH transmission opportunities by combining the index and a set of system parameters, wherein the set of system parameters includes one or more of a cell-ID, a system frame number, a number of downlink (DL) to uplink (UL) switch points within a radio frame, a first set of RACH configurations, one or more time division duplexed (TDD) configurations, and a number of resource blocks in UL.

10. The method of claim 8, wherein communicating the second signal comprises communicating a physical RACH (PRACH) configuration index,
wherein communicating the index comprises communicating an uplink-downlink configuration index during a time-frequency instance in which the legacy UEs are not configured to detect uplink-downlink configuration updates, and
wherein the next-generation UEs identify the third set of RACH transmission opportunities by combining the PRACH configuration index with the uplink-downlink configuration index.

11. An access point (AP) comprising:
a processor; and
a non-transitory computer readable storage medium storing programming for execution by the processor, the programming including instructions to:
transmit a first signal to a set of user equipments (UEs), the first signal assigning a first sub-set of subframes for RACH transmission by legacy UEs in the set of UEs, the first sub-set of subframes being configured as uplink subframes under an initial frame configuration, wherein the first sub-set of subframes includes at least one subframe that is configured as a downlink subframe under one or more frame configurations in a set of candidate frame configurations;
transmit a second signal to next-generation UEs in the set of UEs, the second signal assigning a second sub-set of subframes for RACH transmission opportunities by the next-generation UEs, the second sub-set of subframes being configured as uplink subframes under the initial frame configuration;
restrict selection of an updated frame configuration to a subset of candidate frame configurations that maintain the first sub-set of subframes as uplink subframes, the subset of candidate frame configurations excluding the one or more frame configurations that configure at least one subframe in the first sub-set of subframes as a downlink subframe; and
communicate an index associated with the updated frame configuration to the next-generation UEs, the updated frame configuration reconfiguring at least some subframes in the second sub-set of subframes as downlink subframes without reconfiguring any subframes in the first sub-set of subframes such that uplink subframes allocated for RACH transmissions by the legacy UEs remain configured for uplink transmission, wherein the index goes undetected by the legacy UEs.

12. The AP of claim 11, wherein the next-generation UEs are configured to check for an updated uplink-downlink configuration index more frequently than the legacy UEs.

13. The AP of claim 11, wherein the second sub-set of subframes include at least some subframes excluded from the first sub-set of subframes.

14. The AP of claim 11, wherein the programming further includes instructions to:
receive a random access preamble from one or more of the set of UEs; and
transmit a random-access response (RAR) in response to the random access preamble.

15. A method for managing random access channel (RACH) transmission opportunities in a cell of a network, the method comprising:
sending, by a base station, a first system information block (SIB) signal to a group of legacy user equipments (UEs) and a group of next-generation UEs, wherein the first SIB signal allocates a first sub-set of subframes for RACH transmission by the group of legacy UEs, the first sub-set of subframes being configured as uplink subframes under an initial frame configuration, wherein the first sub-set of subframes includes at least one subframe that is configured as a downlink subframe under one or more frame configurations in a set of candidate frame configurations;
allocating a second sub-set of subframes for RACH transmission by the group of next-generation UEs, the second sub-set of subframes being configured as uplink subframes under the initial frame configuration and including at least some subframes excluded from the first sub-set of subframes;
restricting selection of an updated frame configuration to a subset of candidate frame configurations that maintain the first sub-set of subframes as uplink subframes, the subset of candidate frame configurations excluding the one or more frame configurations that configure at least one subframe in the first sub-set of subframes as a downlink subframe; and sending, to the group of next-generation UEs, a second signal associated with the updated frame configuration, the second signal reconfiguring at least some subframes in the second sub-set of subframes as downlink subframes without reconfiguring any subframes in the first sub-set of subframes such that subframes allocated for RACH transmissions by legacy UEs remain configured for transmission, wherein the second signal is undetected by the group of legacy UEs.

16. The method of claim 15, wherein the second signal comprises a second SIB signal or a second field in the first SIB signal.

17. The method of claim 15, wherein the second signal comprises a dedicated Radio Resource Control (RRC) signal.

18. The method of claim 15, wherein the second signal specifies whether the first sub-set of subframes are further allocated for RACH transmission by the group of next-generation UEs.

19. The method of claim 18 wherein the second signal allocates the second sub-set of subframes for RACH transmission by the group of next-generation UEs.

20. A method for managing random access channel (RACH) transmission opportunities within a cell of a network, the method comprising:
  broadcasting, by a base station, a first index to a group of legacy user equipments (UEs) and a group of next-generation UEs, the first index indicates an initial uplink-downlink configuration in the cell that configures a set of uplink subframes;
  allocating a first sub-set of subframes for RACH transmissions by the group of legacy UEs, and a second sub-set of subframes for RACH transmission by the group of next-generation UEs, wherein the first sub-set of subframes and the second sub-set of subframes are configured for uplink transmission during the initial uplink-downlink configuration, and wherein the first sub-set of subframes includes at least one subframe that is configured as a downlink subframe under one or more frame configurations in a set of candidate frame configurations;
  selecting an uplink-downlink configuration from a plurality of possible uplink-downlink configurations in accordance with a selection criteria, wherein the selection criteria requires the first sub-set of subframes allocated for RACH transmission by the group of legacy UEs to remain configured for uplink transmission for the selected uplink-downlink configuration; and
  sending a second index to the group of next-generation UEs, wherein the second index indicates the cell is transitioning from the initial uplink-downlink configuration to the selected uplink-downlink configuration, wherein the selected uplink-downlink configuration reconfigures at least some uplink subframes in the second sub-set of subframes as downlink subframes, and wherein the second index is undetected by the group of legacy UEs.

21. An access point (AP) comprising:
  a processor; and
  a non-transitory computer readable storage medium storing programming for execution by the processor, the programming including instructions to:
  send a first system information block (SIB) signal to a group of legacy user equipments (UEs) and a group of next-generation UEs, wherein the first SIB signal allocates a first sub-set of subframes for RACH transmission by the group of legacy UEs, the first sub-set of subframes being configured as uplink subframes under an initial frame configuration, wherein the first sub-set of subframes includes at least one subframe that is configured as a downlink subframe under one or more frame configurations in a set of candidate frame configurations;
  allocate a second sub-set of subframes for RACH transmission by the group of next-generation UEs, the second sub-set of subframes being configured as uplink subframes under the initial frame configuration and including at least some subframes excluded from the first sub-set of subframes;
  restrict selection of an updated frame configuration to a subset of candidate frame configurations that maintain the first sub-set of subframes as uplink subframes, the subset of candidate frame configurations excluding the one or more frame configurations that configure at least one subframe in the first sub-set of subframes as a downlink subframe; and
  send, to the group of next-generation UEs, a second signal associated with the updated frame configuration, the second signal reconfiguring at least some subframes in the second sub-set of subframes as downlink subframes without reconfiguring any subframes in the first sub-set of subframes such that subframes allocated for RACH transmissions by legacy UEs remain configured for transmission, wherein the second signal is undetected by the group of legacy UEs.

* * * * *